United States Patent [19]
Trickey et al.

[11] Patent Number: 5,980,639
[45] Date of Patent: Nov. 9, 1999

[54] HYDROCYCLONES AND ASSOCIATED SEPARATOR ASSEMBLIES

[75] Inventors: Lawrence A. Trickey, London, Canada; Geoffrey J. Childs, Conwall, United Kingdom

[73] Assignees: Richard Mozley Limited, United Kingdom; Corn Products International, Inc., Bedford Park, Ill.

[21] Appl. No.: 09/107,632

[22] Filed: Jun. 30, 1998

[51] Int. Cl.[6] .............................. C08B 30/04; B03B 5/34; B04C 5/04; B04C 5/24
[52] U.S. Cl. ............................... 127/24; 127/69; 209/725; 209/728; 209/732; 209/734
[58] Field of Search ........................ 127/24, 69; 209/725, 209/728, 732, 734

[56] References Cited

U.S. PATENT DOCUMENTS

| | | |
|---|---|---|
| 2,765,918 | 10/1956 | Fontein et al. . |
| 3,261,467 | 7/1966 | Wikdahl . |
| 3,358,833 | 12/1967 | Cantrell . |
| 3,371,794 | 3/1968 | Johnson . |
| 3,747,306 | 7/1973 | Wikdahl . |
| 3,800,946 | 4/1974 | Reid et al. . |
| 3,893,914 | 7/1975 | Bobo . |
| 3,940,331 | 2/1976 | Rastatter . |
| 3,988,239 | 10/1976 | Malina . |
| 3,989,628 | 11/1976 | Bier . |
| 4,123,364 | 10/1978 | Mozley . |
| 4,148,723 | 4/1979 | Mozley . |
| 4,189,377 | 2/1980 | Dahlberg et al. . |
| 4,260,480 | 4/1981 | Lewis et al. . |
| 4,426,283 | 1/1984 | Fecske . |
| 4,539,105 | 9/1985 | Metcalf . |
| 4,581,142 | 4/1986 | Fladby et al. . |
| 4,650,584 | 3/1987 | Macierewicz . |
| 4,673,495 | 6/1987 | Carroll et al. . |
| 4,765,887 | 8/1988 | Lister . |
| 4,793,925 | 12/1988 | Duvall et al. . |
| 4,797,203 | 1/1989 | Macierewicz . |
| 5,194,150 | 3/1993 | O'Brien et al. . |
| 5,336,410 | 8/1994 | O'Brien et al. . |
| 5,388,708 | 2/1995 | Bouchillon et al. ............... 209/728 |
| 5,499,720 | 3/1996 | Bouchillon et al. . |

FOREIGN PATENT DOCUMENTS

| | | |
|---|---|---|
| 1286635 | 8/1985 | Canada . |
| 0 003 594 | 8/1979 | European Pat. Off. . |
| 31 16873 A1 | 11/1982 | Germany . |
| 1072524 | 11/1963 | United Kingdom . |
| 2 136 327 | 9/1984 | United Kingdom . |

OTHER PUBLICATIONS

PCT/GB97/00925 Jul. 4, 1997 International Search Report.
Sales Brochure for Dorrclone Type TMC, TM, and C cyclones, (1976) no month available.
Sales Brochure for the DorrClone Hydrocyclone, (1984) no month available.

*Primary Examiner*—David Brunsman
*Attorney, Agent, or Firm*—Norris, McLaughlin & Marcus

[57] ABSTRACT

Hydrocyclones and separator assemblies a wherein the hydrocyclones installed in the separator assemblies by a push fit and are under no lateral tensile or compressive stress. The body has an interior defined by an axially-extending frusto-conical separating chamber which extends from an inlet chamber nearer an overflow end to an underflow outlet opening at an underflow end. The body also has a tangential inlet to the inlet chamber. A tubular vortex finder member fits through the overflow end of the body into a cooperating seat therein and is snap fitted in the body. The vortex-finder member is seated in a predetermined position in which a portion thereof extends through the inlet chamber to define the axial overflow outlet from the separating chamber, said portion having a helical guide surface to guide the inlet flow from the tangential inlet towards the separating chamber. The vortex-finder also is extended so that a small clearance is created between the outlet end of the vortex finder and the outer casing of the separator assembly and the small clearance allows the hydrocyclone to float laterally during operation of the separator assembly so that the hydrocyclone is under no tensile or compressive stress.

26 Claims, 6 Drawing Sheets

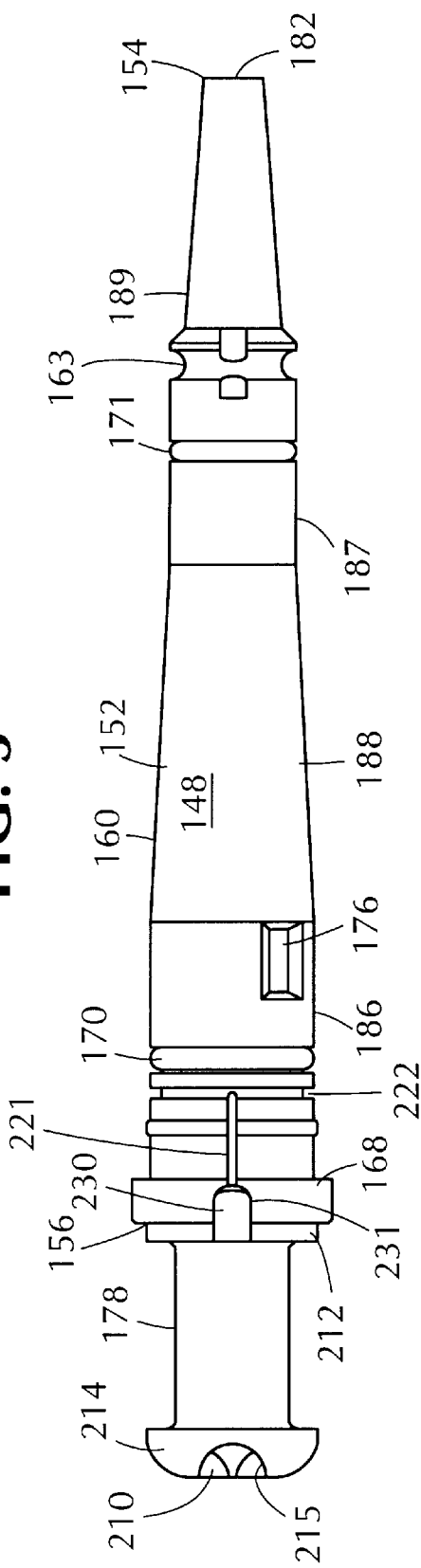
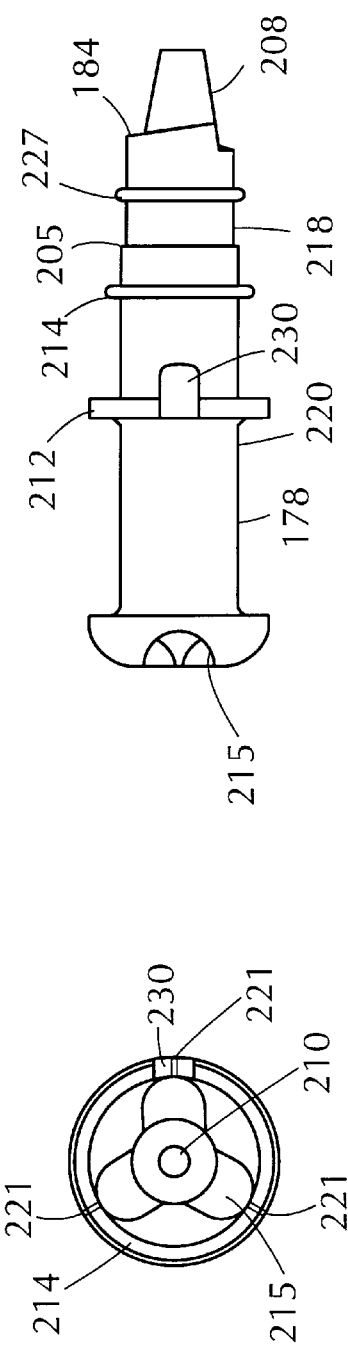
FIG. 3
FIG. 4
FIG. 5

FIG. 6
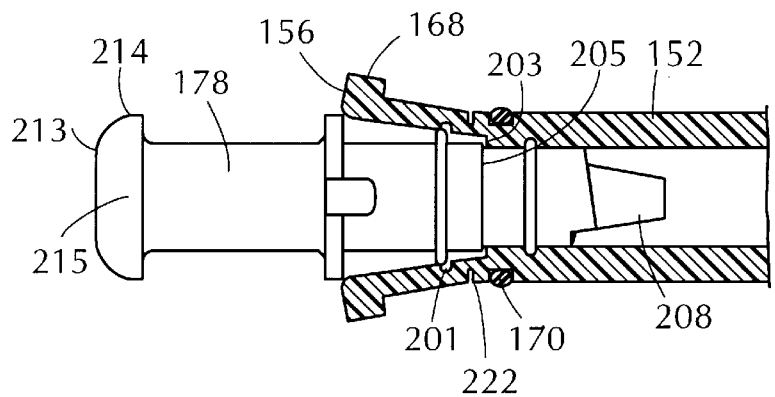
FIG. 7
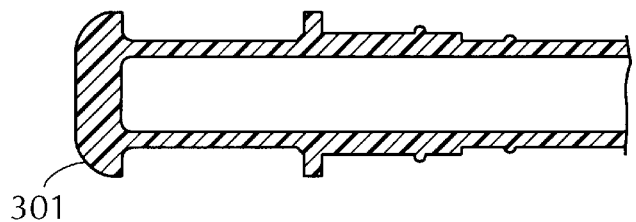
FIG. 8
FIG. 9
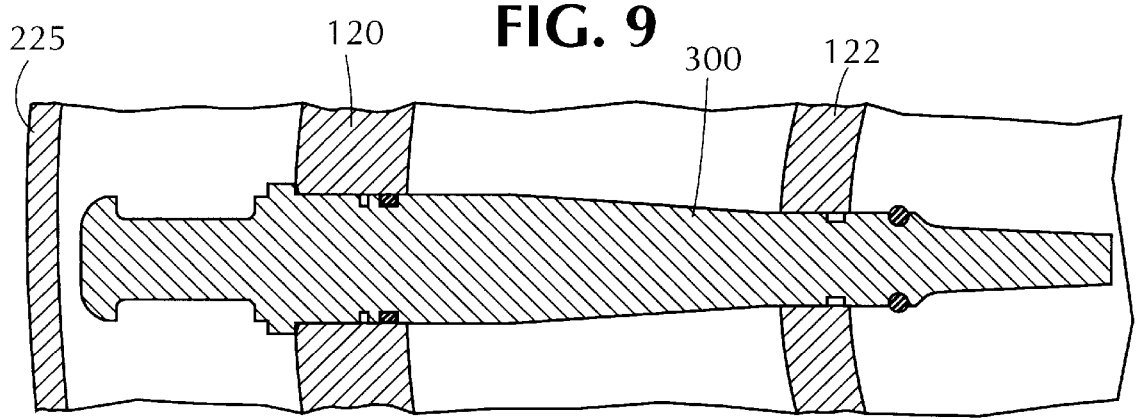

FIG. 12
PRIOR ART
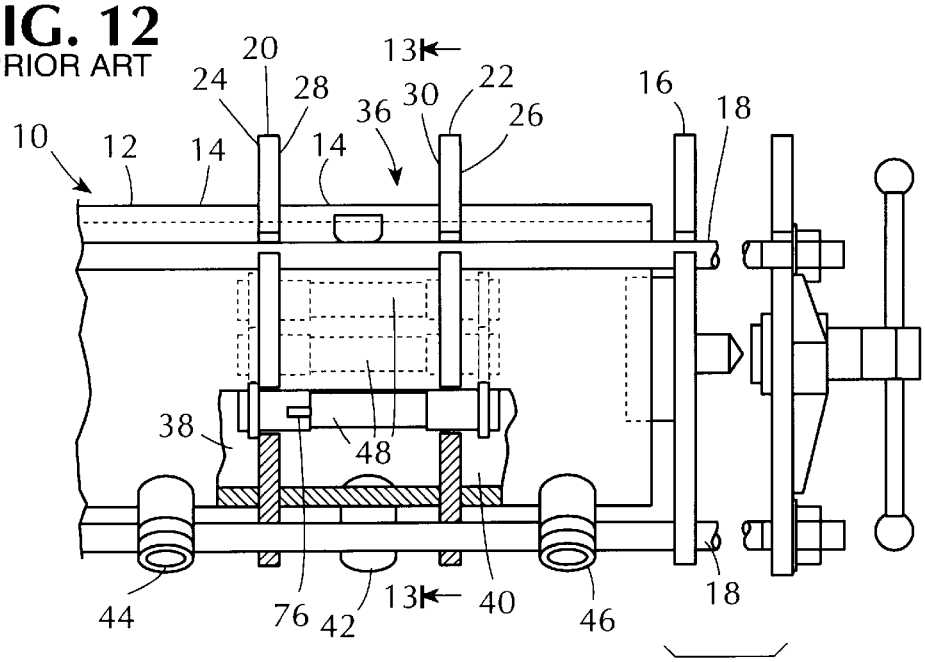
FIG. 13
PRIOR ART
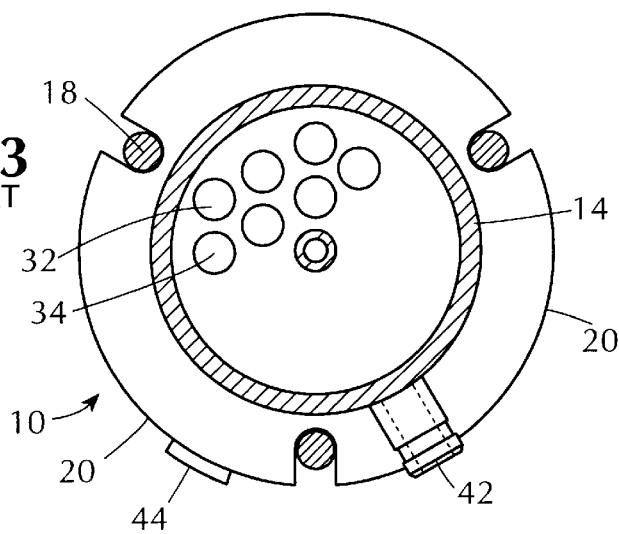
FIG. 14
PRIOR ART

HYDROCYCLONES AND ASSOCIATED SEPARATOR ASSEMBLIES

BACKGROUND OF THE INVENTION

1. Field of the Invention

The present invention relates to hydrocyclones for separating a slurry into separate constituents by density and particle size and to separator assemblies utilizing the hydrocyclones. More particularly, the present invention relates to an improved hydrocyclone which is not under tensile or compressive stress when it is installed in a separator assembly.

2. Description of Related Art

It is well known to use hydrocyclones to separate particles of different sizes carried in a fluid stream. The particle separation achieved is governed by various factors including the dimensions of the hydrocyclone, the density of the suspension to be separated and its inlet pressure. To achieve some separations, it is necessary to use extremely small hydrocyclones which have a correspondingly small throughput. In order to achieve a commercially viable throughput, it is then necessary to employ a multitude of such hydrocyclones assembled in parallel. The most effective use of hydrocyclones is in separator assemblies with multi-stage operations. In the corn wet milling industry, hydrocyclones are used in starch wash operations, where multi-stage counter-current assemblies are preferred for purification of starch by removal of contaminants to the light phase, such as soluble and insoluble proteins, fine fibers, etc.

One type of a known separator assembly which uses a multitude of hydrocyclones is illustrated in FIGS. 12 to 14 of the accompanying drawings, in which:

FIG. 12 is a schematic, partially sectioned side elevational view of part of the prior art separator assembly;

FIG. 13 is a section taken on line 13—13 of FIG. 12; and

FIG. 14 is an enlarged axial-sectional view of a hydrocyclone incorporated in the assembly of FIGS. 12 and 13.

The prior art assembly of FIGS. 12 to 14 will now be described in brief with an emphasis on those parts which lead to an understanding of the present invention.

With reference to FIG. 12, a part of a separator assembly generally indicated as 10 is shown. Separator assembly 10 has a generally cylindrical casing 12, only one end portion of which is shown, and which is constituted by annular walls 14 and end walls 16. Walls 14, 16 are clamped together by longitudinally extending bolt members 18 and end clamp members (not shown) with the interposition of pairs of transverse round partitions 20, 22 extending perpendicular to casing 12 axis and clamped between adjacent edges of annular walls 14. Only one pair of partitions 20, 22 is shown. Casing 12 may include any number of such pairs of partitions 20, 22. Partitions 20, 22 each have outer faces 24, 26 and opposing inner faces 28, 30, respectively.

With reference to FIGS. 12 and 13, each partition 20, 22 has a plurality of circular apertures 32, 34, respectively, arranged in regular two dimensional arrays. Apertures 32, 34 in each pair of partitions 20, 22 are axially aligned. Not all of apertures 32, 34 are shown in FIG. 13, for clarity of illustration.

Partitions 20, 22 define central inlet chamber 36 between their opposing faces 28, 30 and two outlet chambers 38, 40 adjacent their outer faces 24, 26, respectively. An inlet duct 42 opens into central inlet chamber 36 while outlet ducts 44, 46 open from outlet chambers 38, 40, respectively.

Inlet chamber 36 does not communicate directly through apertures 32, 34 in partitions 20, 22 with outlet chambers 38, 40 but through hydrocyclones 48, each of which extends parallel to the chamber 36 axis. with reference to FIG. 14, each hydrocyclone 48 is formed in two cooperatingly screw threaded parts 50 and 52. Part 52 has an underflow end 54 and an opposite overflow end 56. Parts 50 and 52 have substantially cylindrical outer surfaces 58 and 60, each formed with annular grooves 62 and 64 therein and having flange 66 and end flange 68, projecting from their ends. O-rings 70 are provided to fit into each of the cooperating grooves 62 and 64.

When interengaged, the inner surface of part 52 defines a frusto-conical internal separating chamber 72 to extend and taper between overflow end 56 and underflow end 54 thereof. Surface 60 has inlet cavity 74 formed at overflow end 56 of part 52. Each inlet cavity 74 has a rectangular tangential inlet opening 76 into it from central chamber 36.

Continuing with FIG. 14, vortex finder 78 projects through inlet cavity 74, terminating axially downstream of tangential inlet opening 76 and defines a first axial outlet 80, the overflow outlet, which communicates with the adjacent outlet chamber 38 (shown in FIG. 12) of assembly 10 while the opposite underflow end 54 of hydrocyclone 48, clamped in the opposite partition 22, has a second axial outlet 82, the underflow outlet, which communicates with outlet chamber 40. Vortex finder 78 also defines a helical channel 84 (not shown) the beginning of which faces inlet opening 76.

When assembled in assembly 10, hydrocyclones 48 extend through and are sealed in apertures 32 and 34 by means of O-rings 70 fitted in grooves 62 and 64, which create seals between central chamber 36 and outlet chambers 38 and 40, respectively. Inlet cavity 74 is located adjacent partition 20. Flange 66 of part 50 abuts outer face 24 of partition 20, while end flange 68 of part 52 abuts outer face 26 of part 22.

In use of assembly 10, a suspension to be classified is pumped under pressure into central inlet chamber 36 through inlet duct 42 and is forced through tangential inlet openings 76 of hydrocyclones 48 into their frusto-conical chambers 72. Helical channel 84, defined by vortex finder 78, ducts the inlet flow circumferentially and axially toward frusto-conical chamber 72, thereby reducing the turbulence that would arise in a purely cylindrical inlet cavity. In each chamber 72, the suspension is separated into two flows. The first, termed the overflow, contains the finer particles and exits through first axial outlet 80 into chamber 38 while the second, termed the underflow, containing coarser particles, exits through the opposite outlet 82 into chamber 40. Naturally, the combined overflows from hydrocyclones 48 exit from assembly 10 through outlet duct 44 while the combined underflows exit through outlet duct 46.

Separator assembly 10 described in relation to FIGS. 12 to 14 achieves good separation, but has certain problems and disadvantages.

A first problem is in the assembly of hydrocyclones 48. In order to enable hydrocyclones 48 to be inserted and firmly held in their positions of use, extending through partitions 20 and 22, parts 50 and 52 are inserted through opposing apertures 32 and 34 from outer faces 24 and 26 of partitions 20 and 22, respectively, to meet in central chamber 36 and are screwed tightly together until flanges 66, 68 abut outer faces 24 and 26. In order to screw parts 50 and 52 together, each end needs to be gripped by a suitable tool to enable adequate tightening. Access to outer faces 24 and 26 of both partitions 20 and 22 simultaneously, however, can be problematical and this process is further complicated by the fact that vortex finder 78 is formed as a separate part which is inserted into inlet opening 76 defined by hydrocyclone part 50 through its screw-threaded end which mates with part 52. The insertion of vortex finder 78 is an awkward operation since it is a close fit in its seat in part 50 but is small and not easy to manipulate. Also, although it is shaped to key with its seat in one specific orientation, there is no positive engagement between the two parts, and vortex finder 78 is held in position by clamping between the two interengaged parts 50 and 52. All of the parts must therefore be very precisely dimensioned in relation to each other and there is always a possibility of vortex finder 78 being accidentally shaken from its seat during the screwing together of parts 50 and 52.

An alternative prior-art hydrocyclone, disclosed in connection with a Type C "Clamshell" housing in a 1976 Dorr-Oliver brochure, used in a similar assembly as that shown in FIG. 12, is easier to assemble. Each Type C 10 mm hydrocyclone is formed in three parts, each injection molded in nylon. The components are a major annular body part, a tubular vortex finder and an apex nut which is hexagonal and internally threaded to mate with corresponding external threads on the annular body at the underflow end. The vortex finder has a hexagonal head forming a flange and a parallel threaded section below the head which threadably mates with corresponding threads internal to the annular body at the overflow end. The body can be inserted through the corresponding holes in the two partitions from the overflow side until the vortex finder head, serving as a stop member, abuts the outer face of the partition on the overflow end and the opposite underflow end projects through the other partition, on the underflow end. The apex nut is then screwed onto the projecting underflow end of the body and tightened into contact with the outer face of the partition on the underflow end, so that the hydrocyclone is clamped to the outer surfaces of the partitions, thereby placing the hydrocyclones under tension.

A major problem with this alternative hydrocyclone arises. Precisely because of the screw-fitting of the vortex finder, it is difficult to provide a helical surface on the vortex finder, as will be described below with respect to the present invention, to improve the fluid flow into the hydrocyclone separating chamber. It is difficult because the vortex finders and hence the helical surface cannot be aligned accurately with the inlet. The hydrocyclone must, therefore, have relatively smaller dimensions and a correspondingly smaller throughput to achieve a given degree of separation. Considering assemblies including tens, or even a hundred or more, of such hydrocyclones, it will be appreciated that even slight differences in throughput have a great effect on the overall performance of the assembly.

A further problem with this alternative construction is that, in use, the suspension to be separated is pumped into the central chamber of the separator assembly under considerable pressure which may cause outward deflection of the partitions, thus putting the hydrocyclones under additional strain, or tension. The strain reduces the working life of the hydrocyclones.

Also, because both of the O-rings in this construction are the same size, the distal O-ring, which has to be pulled through two holes of the separator assembly on disassembly, often breaks or is damaged.

Furthermore, the alternative prior art hydrocyclone described above is used particularly in the food industry in a counter-current washing circuit in which clean wash water pumped in at one end separates gluten from corn starch. The clean corn starch exiting with the underflow while the gluten is washed out with the overflow. A further problem that arises with this use is that the hydrocyclones are made from NYLON, which reacts with sulfur dioxide used as a preservative in the corn starch slurry and embrittles over the years. The combination of embrittlement and strain can lead to fracture of the hydrocyclone body as well as reduced capacity and performance, leading to production losses and to incurment of relatively high replacement costs. Another problem with the use of NYLON as a material of construction for hydrocyclones is that the material tends to expand on contact with the slurry of water and processed corn during separation, and in a non-uniform manner.

Another type of separator assembly which uses a multitude of hydrocyclones is illustrated in "The Dorr Clone Hydrocyclone" sales brochure, 1976. These assemblies, in which one or both of the wall members is removable, are designated as "Type TM". The TM assemblies utilize 10 mm hydrocyclones to wash starch in corn wet milling operations. An adaptation of this assembly also is described in U.S. Pat. No. 5,499,720 and a related patent is U.S. Pat. No. 5,388,708.

Each type TM hydrocyclone is formed in two parts, each injection molded from nylon, comprising a major annular body part and a tubular vortex finder, which fits by insertion into the body part. The major annular body part extends between its overflow end and opposite underflow end. The body part has an exterior defined by a semi-annular flange at its overflow end, which connects to a relatively short cylindrical portion of a smaller diameter than the flange. The short cylindrical portion further connects to a frusto conical portion which tapers toward an annular radially projecting stop member, which has a diameter approximately equivalent to that of the flange. The stop member connects to a cylindrical boss of a smaller diameter which in turn connects to relatively short frusto-conical transition portion. The transition portion connects to a frusto-conical spigot which tapers to its apex at the underflow end. The semi-annular flange has a rectangular opening bounded on three sides therein connecting to a further rectangular opening, also bounded on three sides. formed in the relatively short cylindrical portion. A rectangle bounded on all four sides, constituting a tangential inlet opening, is formed by cooperation of the body part and the vortex finder. The vortex finder is provided with a frusto-conical guide surface, which projects and extends through the inlet chamber and terminates axially downstream of the tangential inlet when assembled with the body. These hydrocyclones are held in place by being compressed between their respective partition plates.

This separator assembly achieves good separation, but has certain problems and disadvantages.

These cyclones are used particularly in the food industry, particularly in corn wet milling, in a counter-current washing circuit in which clean wash water pumped in at one end separates gluten from corn starch, the clean corn starch exiting with the underflow while the gluten is washed out with the overflow. A problem that arises with this use is that the hydrocyclones are injection molded from NYLON. The NYLON reacts with sulfur dioxide, used as a preservative in the corn starch slurry, and embrittles over the years. The combination of embrittlement and compression of the cyclones between the plates can lead to fracture of the hydrocyclone body as well as reduced capacity and performance, leading to production losses and to incurment of relatively high replacement costs.

The capacity and performance of the hydrocyclones is further limited due to the overall external and internal configuration of the hydrocyclone, which is the key parameter for optimal operation of hydrocyclones. The vortex finder is not provided with a helical guide surface, which would improve the fluid flow into the hydrocyclone separating chamber. The hydrocyclones, therefore, have a relatively small throughput to achieve a given degree of separation. Considering assemblies including tens, or even a hundred or more, such hydrocyclones, it will be appreciated that even slight differences in throughput have a great effect on the overall performance of the assembly.

The present invention, therefore, seeks to provide hydrocyclones particularly of a type usable in the assemblies of the general type described above. An object of the present invention is to provide hydrocyclones which overcome the drawbacks and disadvantages of the prior art as discussed above.

An object of the present invention is to provide hydrocyclones which are simpler to assemble and install, as well as to disassemble for repair or maintenance, than previously known hydrocyclones. The invention provides a distal O-ring having a smaller diameter than the proximal O-ring and this resolves the problem of breakage of the distal O-ring which is caused by the prior art construction. Furthermore, the hydrocyclones of the invention are installed in a separator assembly by pushing them into holes that are not threaded, thus substantially reducing the cost of the assembly and the hydrocyclones as well as simplifying assembly and disassembly.

Another object of the present invention is to provide hydrocyclones having a larger internal diameter and a better throughput for a given size of hydrocyclone, and thereby increase the capacity of the overall multi-cyclone separator assembly.

A further object is to provide hydrocyclones which are not under any tensile or compressive stress when they are installed in a separator assembly and which have a longer working life than the prior art hydrocyclones described.

Other objects of the present invention will become apparent from the summary and detailed description which follows.

SUMMARY OF THE INVENTION

The invention provides hydrocyclones comprising a tubular body having an underflow end and an overflow end and having an interior defined by a cylindrical inlet chamber at the overflow end merging into an axially-extending frusto-conical separating chamber which tapers from the inlet chamber to an underflow outlet opening at the underflow end. For use in separating non-abrasive substances, such as corn starch, the hydrocyclones are preferably constructed by injection molding from polypropylene material which is not subject to attack by $SO_2$.

The body has a tangential inlet to the inlet chamber, preferably having a rectangular cross-section. The hydrocyclone further includes a vortex-finder member having a proximal end which fits through the overflow end of the body and snaps into the body (like a collett) in a predetermined position and a portion thereof extends through the inlet chamber to define the axial overflow outlet from the separating chamber. The vortex finder has a guide surface which preferably comprises a helical surface arranged to guide the inlet flow circumferentially and axially towards the separating chamber. The vortex finder is extended at its distal end so that a small clearance is created between the outlet end of the vortex finder and the inner wall of the outer casing of the separator assembly and said outlet end is scalloped to allow the overflow to escape.

A further aspect of the invention provides, in combination with the hydrocyclones of the present invention, a separator assembly having two opposing wall members (also referred to herein as housings) defining an inlet chamber between them and having at least one pair of opposing apertures communicating with respective outlet chambers, and hydrocyclones as described above fitted and sealed in each said pair of opposing apertures so that the chambers are sealingly isolated from one another except through the hydrocyclones. In the preferred embodiment, the opposing wall members are inner and outer concentric cylinders and a third concentric outer housing (also referred to herein as an outer casing) defines an overflow outlet chamber between said outer housing and the outer concentric cylinder. The inner concentric cylinder defines an underflow outlet chamber.

The hydrocyclones of one embodiment of the present invention may be adapted to be fitted into separator assemblies where the wall members are parallel flat plates, such as the "clamshell" housing. The hydrocyclone has a body which has a substantially cylindrical portion at its overflow end which connects to a substantially frusto-conical portion which tapers toward the underflow end and terminates in a frusto conical spigot. The body can be inserted from the outer surface of the outer wall member through apertures in both wall members until a stop member at the overflow end abuts the outer surface of the outer wall member. In embodiments wherein an outer casing is not used to limit the movement to the hydrocyclone a retaining member can be applied to the underflow end such as a spring clip 165, oversized O-ring or annular spring.

In the preferred embodiment, the hydrocyclone body is retained in its position of use by the cooperation between the outlet end of the vortex-finder and the inner wall of the outer casing. The clearance between said end of the vortex finder and said inner wall is from about 1 to 5 mm, preferably about 1.5 to 3 mm, to allow a small amount of axial movement in the wall member apertures, such as to accommodate the outward movement of the wall members under pressure and dimensional changes caused by differential expansion. In the embodiment wherein the hydrocyclone body is retained in its position using a retaining member at the underflow end, the same clearance is provided between the retaining member and the interior face of the inner wall member.

The invention further relates to processes of purifying corn starch using the hydrocyclones and the separator assemblies of the present.

BRIEF DESCRIPTION OF THE DRAWINGS

Some of the objects of the invention have been stated and others will become apparent as the invention will now be more particularly described, by way of example, with reference to the accompanying drawings, in which:

FIG. 3 is an elevational view of the hydrocyclone illustrated in section in FIG. 1.

FIG. 4 is an elevational view of the overflow end of the hydrocyclone illustrated in FIG. 3.

FIG. 5 is an elevational view of a vortex finder of the invention.

FIG. 6 is a part-sectioned elevational view showing the vortex finder in relation to a sectioned body when the vortex finder is being inserted into or removed from the body.

FIG. 7 is an elevational view in partial section of the underflow end of the hydrocyclone taken along line 7—7 of FIG. 2.

FIG. 8 is a section view of a plug for use instead of a vortex finder to plug a hydrocyclone.

FIG. 9 is a sectional view of a plug in the form of a blank hydrocyclone.

FIGS. 12, 13, and 14 relate to prior art apparatus and have already been described.

DETAILED DESCRIPTION OF THE INVENTION

Figure 1:
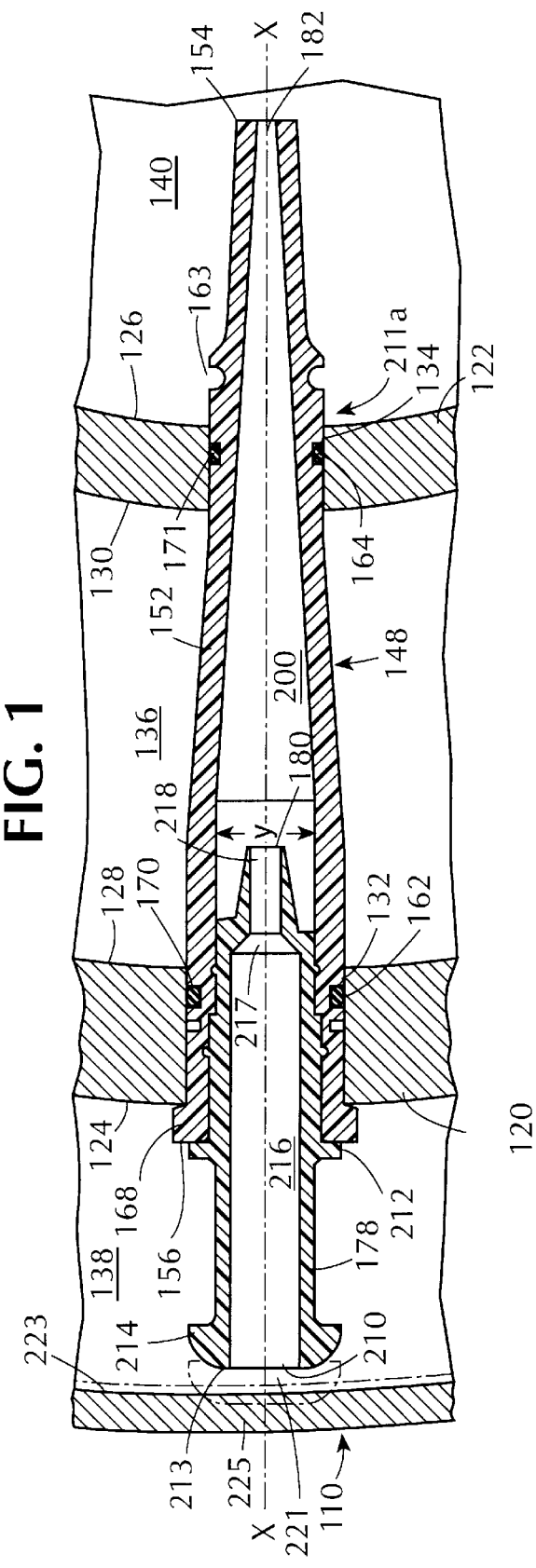
FIG. 1 is a sectional view taken along the axis of a hydrocyclone of the invention fitted in part of the assembly of FIG. 11.
Figure 10:
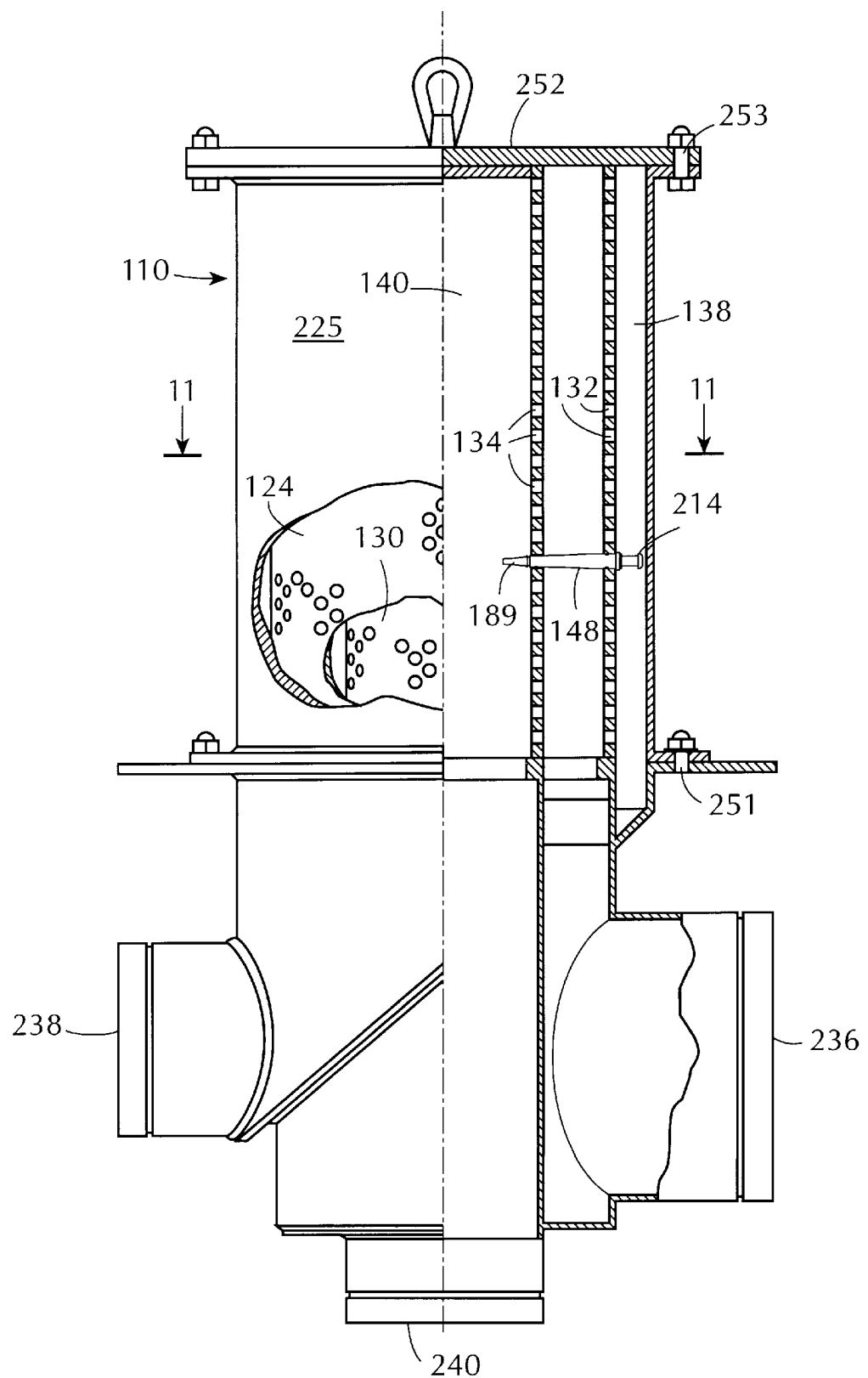
FIG. 10 is a partial sectional view of a separator assembly of the invention.

With reference to FIG. 1, part of assembly 110 of FIG. 10 is shown comprising two partitions 120 and 122, partition 120 having an outer face 124 and partition 122 having an interior face 126, and respective opposing faces, namely, inner face 128 and outer face 130, central inlet chamber 136 defined between them and apertures 132 and 134.

Figure 2:
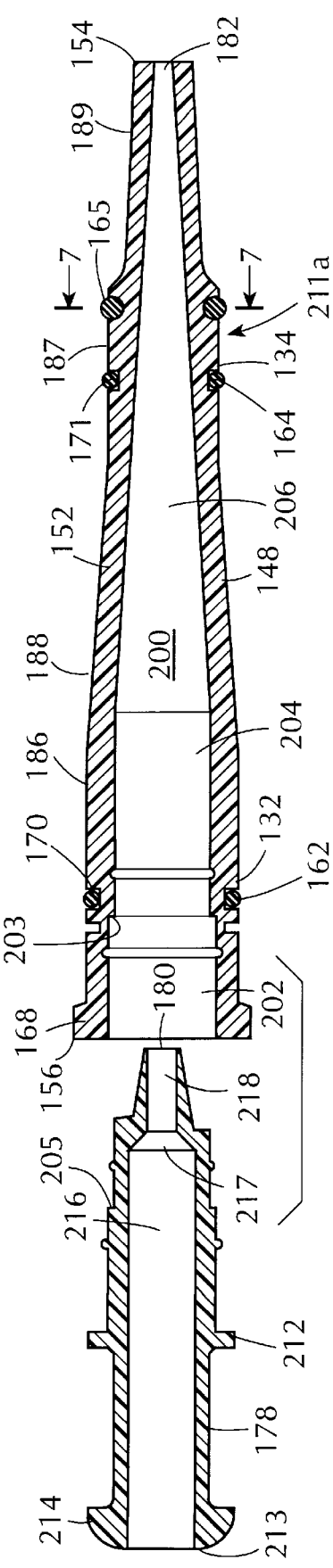
FIG. 2 is an expanded sectional view of the hydrocyclone of the invention.

Referring to FIGS. 1 and 2, each hydrocyclone 148 is formed in two parts, each injection molded from polypropylene, comprising annular body part 152 and a tubular vortex finder 178 which fits by insertion into body part 152. (See also FIG. 6). Proximal O-ring 170 and distal O-ring 171 are provided as seals in apertures 132 and 134 which maintain separation between the cylindrical surfaces defining outlet chambers 138 and 140. (See FIGS. 10 and 11, and corresponding chambers 38 and 40 discussed with reference to FIG. 12.) Each hydrocyclone 148, once fitted in assembly 110, functions like the prior art clamshell type hydrocyclone and has similarly arranged functional parts. However, hydrocyclones 148 embody key structural differences relative to the Type C and TM hydrocyclones described in the prior art and provide unexpected advantages over the Type C and TM hydrocyclones.

With reference to FIGS. 2 and 3, body part 152 has overflow end 156 and an opposite underflow end 154, and is defined by outer surface 160 extending there between. Outer surface 160 of body part 152 has a substantially cylindrical portion 186 at overflow end 156 which connects to a substantially frusto-conical portion 188 which tapers toward a second substantially cylindrical portion 187 which connects to a second substantially frusto-conical portion 189 which tapers toward end 154 and defines underflow outlet 182. The entirety of body part 152 is of smaller diameter than aperture 132 except for flange 168, which has a larger diameter for abutting outer face 124 of partition 120. The second substantially cylindrical portion 187 is of smaller diameter than aperture 134. Annular grooves 162 and 164 are formed in substantially cylindrical portion 186 and second substantially cylindrical portion 187, respectively, for holding O-rings 170 and 171, respectively. Annular groove 163 is formed in second substantially cylindrical portion 187 to provide the option for using a spring clip 165 in an alternate embodiment of the invention. (See FIGS. 2 and 7.)

Referring to FIGS. 1 and 2, body part 152 has an interior defined by bore 200 extending from overflow end 156 toward underflow outlet 182. Bore 200 is comprised of a cylindrical outlet end chamber 202, a cylindrical hydrocyclone inlet chamber 204 having a smaller diameter y than chamber 202 and a frusto-conical separating chamber 206. Internal shoulder 203 is provided between the wider and narrower bores of chambers 202 and 204.

Referring to FIGS. 1 and 3, a rectangular tangential inlet opening 176 opens from central inlet chamber 136 to hydrocyclone inlet chamber 204 which extends into frusto-conical separating chamber 206 tapering to underflow axial outlet 182. Overflow outlet 210 and underflow outlet 182 communicate with outlet chambers 138 and 140, respectively.

Referring to FIGS. 1 and 2, tubular vortex finder 178 has end portion 208 at one end (the proximal end) thereof and head portion 214 at the opposite end (the distal end) thereof. Head portion 214 provides added strength at the overflow end of vortex finder 178 to withstand repeated contact with inside wall 223 of outer casing 225. Head portion 214 is also provided with scallops 215 (See FIG. 4) which allows the overflow to escape into overflow outlet chamber 138.

Vortex finder 178 is also provided with a helical ramp surface 184 (See FIG. 5) at end portion 208 arranged to guide an inlet flow circumferentially and axially toward frusto-conical separating chamber 206. Ramp surface 184 serves the same function as helical channel 84 in the prior art vortex finder 78. Ramp surface 184 is sized and shaped to match the inner surface of hydrocyclone inlet chamber 204.

Referring to FIG. 2, vortex finder 178 has a substantially cylindrical bore 216 which communicates at one end with overflow outlet 210 and communicates at the other end with a frusto-conical bore 217. Frusto-conical bore 217 tapers toward and communicates with one end of a second cylindrical bore 218. The other end of second cylindrical bore 218 communicates with overflow inlet 180.

Referring to FIGS. 5 and 6, Vortex finder 178 has a substantially cylindrical outer surface 220 and a flange 212 provided thereon. Flange 212 serves as a stop member which abuts flange 168 of body part 152. Snap ring 214 is also provided on surface 220. The snap ring cooperates with groove 201 of body part 152 to prevent vortex finder 178 from being pushed out of body part 152. A smaller diameter substantially cylindrical outer surface 218 of vortex finder 178 is provided with a sealing ring 227.

The hydrocyclone 148 is assembled by pushing the vortex finder 178 into overflow end 156 of body part 152. Referring also to FIGS. 3 and 4, three slits 221 and an annular notch 222 are provided in body part 152 to allow body part 152 to open up slightly as illustrated in exaggeration in FIG. 6. Locating tab 230 cooperates with notch 231 (See FIG. 3) to ensure that ramp surface 184 is aligned correctly with tangential inlet opening 176 to inlet chamber 204. When the snap ring 214 snaps into groove 201, body part 152 returns to its original shape until one removes vortex finder 178 by pulling it outwardly and again causing body part 152 to open up slightly. External shoulder 205 also abuts internal shoulder 203 when vortex finder 178 is installed in body part 152. (See FIG. 2.) This "snap-fit" feature, i.e., the vortex finder 178 is "snap-fitted" in body part 152, is unique in the art.

When the hydrocyclone 148 is installed in the separator assembly as shown in FIG. 1, it is simply pushed into the assembly making a push fit. Aperture 132 prevents the body part 152 from opening up so that vortex finder 178 cannot be pulled or pushed out of body part 152 (See partition 120 in FIG. 1.) Body part 152 of hydrocyclone 148 is sufficiently long to extend right through the two partitions 120 and 122. Body part 152, having a smaller diameter than aperture 132 is inserted through aperture 132 of partition 120 from the outer face 124 of partition 120, until flange 168 abuts outer face 124 at aperture 132. When flange 168 abuts outer face 124 at aperture 132, the second substantially cylindrical portion 187, having a smaller diameter than aperture 134, will have been inserted into aperture 134 of partition 122 as illustrated. When assembled in assembly 110, a portion of vortex finder 178 projects from outer face 124 of partition 120 and underflow outlet 182 projects from interior face 126 of partition 122. (See also FIG. 11.)

Figure 11:
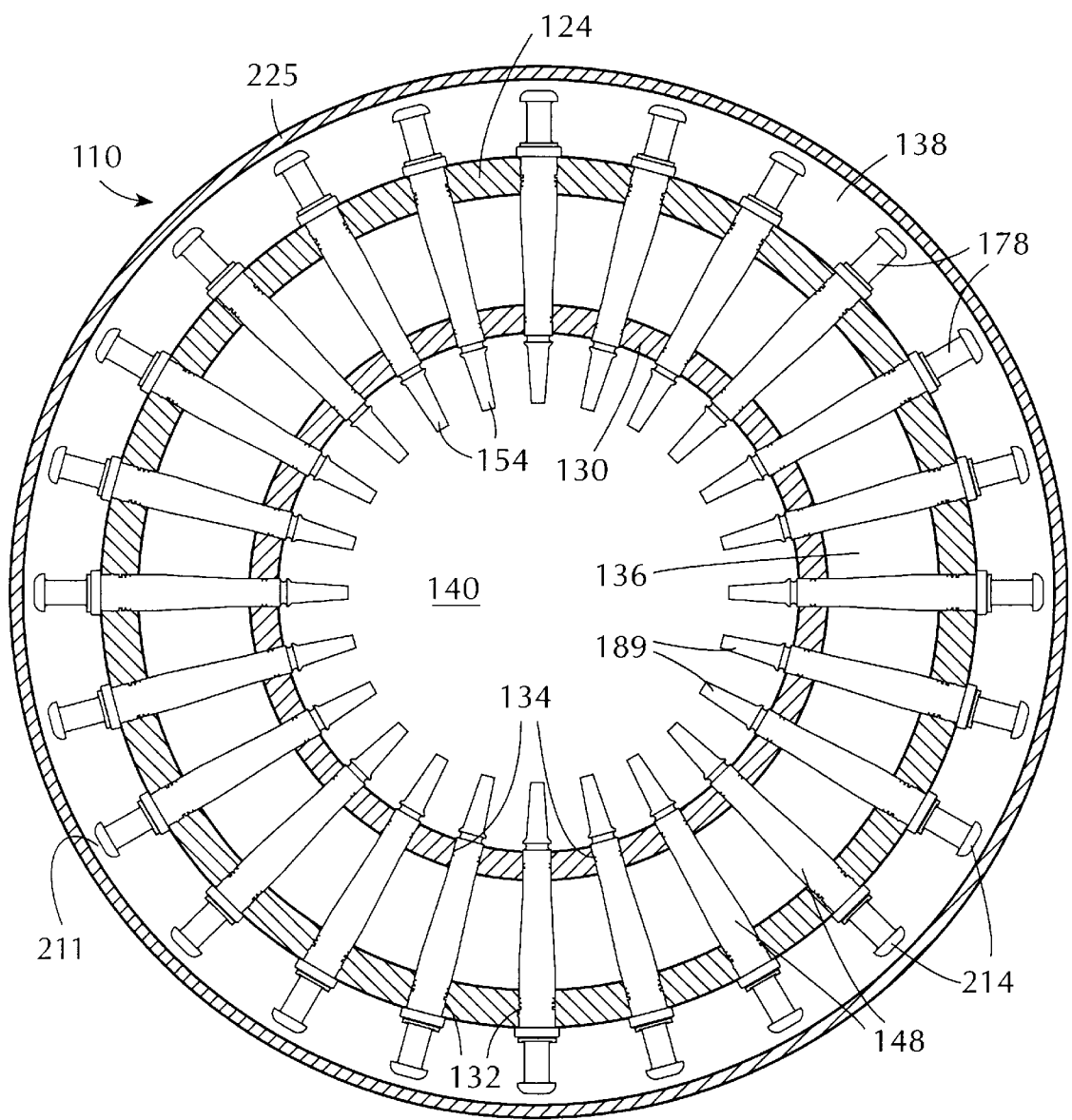
FIG. 11 is a partial sectional view taken along line 11—11 of FIG. 10.

Continuing with the assembly of the separator assembly, and after all of the hydrocyclones 148 have been installed, outer casing 225 is positioned around the overflow outlets 210 to create an enclosure around the hydrocyclones 148 and thus creating the overflow outlet chamber 138. This is illustrated in FIGS. 1, 10 and 11. Outer casing 225 is dimensioned to provide a small clearance 211 between inner wall 223 and the tip 213 of each head portion 214. The clearance 211 allows the hydrocyclones 148 to float (i.e. move laterally along their central axes X—X) during operation of the separator apparatus 110, but inner wall 223 also prevents the hydrocyclones from floating out of the partitions 120 and 122. In order to allow sufficient floating while preventing floating out, the clearance 211 should be from about 1 to 5 mm, preferably from about 1.5 to 3 mm. Accordingly, the hydrocyclones 148 are under no tensile or compressive stress along their central axes X—X.

In embodiments wherein it is not practical to dimension outer housing 225, or its equivalent, to cooperate with tip 213 in the manner described above, spring clip 165 is snapped in place over groove 163 and the clearance 211a (having the same dimension as clearance 211) between spring clip 165 and interior wall 126 allows the hydrocyclone 148 to float in the manner described above. Spring clip 165 is not used in the preferred embodiment of the invention wherein floating is allowed by the cooperation of tip 215 with inner wall 223.

The hydrocyclone 148 of the invention generally can have an internal diameter Y (See FIG. 1) of any dimension permitted by the materials used to manufacture it as long as the functional separating properties are not sacrificed. Typical diameters are from about 10 to about 13 mm with the larger diameters, such as about 12 mm, being preferred because larger diameters permit greater throughput capacity. One of the advantages of the invention is that the hydrocyclones of the invention can have a larger internal diameter than those of the prior art which generally are limited to a maximum internal diameter of about 10 mm. The larger diameter alone allows for increased throughput of more than about 40%.

Another advantage of the preferred embodiment of the present invention is that hydrocyclones 148 can be installed and removed with access only to outer face 124 of partition 120. This means that assembly and disassembly is much facilitated compared with that required for the prior art assembly of FIGS. 12 to 14. Furthermore, the TM type hydrocyclones of the prior art are held in place under compression with a screw plug if they are mounted in concentric partitions they necessitate complicated and expensive plate hole manufacture, difficult and time consuming installation and more parts. In contrast, the hydrocyclones of the present invention are installed simply by pushing them into the assembly.

The dimensions of hydrocyclones 148 allow for a maximum number of hydrocyclones to be installed in a given area, i.e., a dense arrangement. This is an advantage because the capacity of separator assembly 110 is determined not only by the size, but also by the number of hydrocyclones 148.

It will be appreciated that vortex finder 178 is much simpler to insert and retain in body part 152 than the prior art vortex finder 78.

It may be desired to reduce the flow capacity by replacing one or more of the hydrocyclones with a blank body 300 or by inserting a plug 301 into the overflow outlet 210 of vortex finder 178. (See FIGS. 8 and 9.) Plug 301 is a blank vortex-finder insert which not only blocks the overflow outlet but it blocks the inlet 176 of hydrocyclone 148.

Assembly 110 may be used for counter-current washing in corn wet milling, for thickening duties, or for other applications, where small particle sizes are involved. Referring to FIGS. 10 and 11, separator assembly 110 is provided with an assembly inlet 236, an assembly overflow outlet 238 and an assembly underflow outlet 240. Outer casing 225 is secured in place as part of the assembly by means of bolts 251 and is easily removed and installed. Bolts 253 which fasten end plate 252 to outer casing 225 do not need to be removed in order to remove or install outer casing 225.

In the manufacture of hydrocyclone 148, a suitable material is selected based on a number of criteria, depending on the application. Relevant criteria include abrasion resistance, temperature resistance, pressure resistance, resistance to chemical attack, resistance to water absorption, among possibly others, such as difficulty of processing and expense. A number of materials may satisfy these categories, for example, TEFLON. If hydrocyclone 148 of the present invention is to be used for corn wet milling operations, polypropylene, which is not embrittled by sulfur dioxide in the same way as NYLON, and which has been approved by the FDA for these applications, is preferred. Polypropylene is amenable to molding with thinner walls, such as that for a given external diameter of hydrocyclone 148, and a larger internal diameter can be achieved, relative to the hydrocyclones of the prior art. For example, the 12mm internal diameter hydrocyclone 148 may be made from polypropylene with substantially the same external dimensions as the prior-art 10 mm hydrocyclones because it is possible to mold the polypropylene with thinner walls. A larger internal diameter allows for greater hydraulic capacity, as one skilled in the art will readily appreciate.

A specific example of the preferred use of hydrocyclones 148 is in the separation of corn starch from gluten, as indicated above. For this purpose, a 12 mm-internal diameter hydrocyclone 148 may be used instead of the prior art clamshell type hydrocyclone or type TM hydrocyclone, respectively, having a maximum internal diameter of 10 mm. Rectangular inlet opening 176 provides for improved flow characteristics and the shape of the hydrocyclones allows them to be installed in close proximity to one another (i.e. in a high density). Each of these features individually and in combination allows for an increase in throughput. The qualitative separation achieved by hydrocyclone 148 of the present invention, although not quite as good as that achieved by the smaller hydrocyclones 48, is still excellent and certainly acceptable, bearing in mind the savings achieved by the increased throughput and the longer working life of hydrocyclones 148. The savings in fact result from reductions in production times, lower power consumption, a reduction in the consumption of washing water for the corn starch, stability of performance and capacity over the longer working life of the hydrocyclone, and no damage to the bottom O-ring 171 when the hydrocyclone is removed from the separator assembly.

The illustrated best mode embodiment of the hydrocyclones of the present invention is directed to corn wet milling operations. However, the invention has broader application than the illustrated examples. It is understood that the foregoing detailed description is given merely by way of illustration and that modifications and variations may be made therein without departing from the spirit and scope of the invention.

We claim:

1. A hydrocyclone comprising:

a tubular body having an underflow end, an opposite overflow end, and an interior portion defined by an inlet chamber disposed near the overflow end and an axially-extending frusto-conical separating chamber which tapers from said inlet chamber to said underflow end;

said body having a cooperating seat therein;

said inlet chamber having a tangential inlet and said underflow end having an underflow outlet opening;

a tubular vortex-finder member having a distal end and a proximal end and an interior portion having an opening at each said end, the proximal end being insertable through said overflow end of said body into said cooperating seat, said member seated in a predetermined position in which the proximal end thereof extends into said inlet chamber and said distal end extends outwardly of said overflow end to define an axial overflow outlet from said separating chamber;

said hydrocyclone having an outer surface extending from said underflow end to said distal end;

the outer surface having an inlet opening disposed between said underflow end and said distal end, a means for retaining a first sealing member disposed between said inlet opening and said underflow end, a means for retaining a second sealing member disposed between said inlet opening and said distal end and a radially projecting stop member disposed between said means for retaining a second sealing member and said distal end.

2. A separator assembly comprising the hydrocyclone of claim 1.

3. The hydrocyclone of claim 1 comprised of polypropylene.

4. The hydrocyclone of claim 1 manufactured by injection molding.

5. The hydrocyclone of claim 1 wherein said vortex finder member comprises means for guiding said inlet flow circumferentially and axially from said tangential inlet toward said separating chamber.

6. The hydrocyclone of claim 1 wherein said body is formed with means for supporting said underflow outlet, thereby ensuring that said underflow outlet is aligned with said overflow outlet and concentric with said inlet chamber.

7. The hydrocyclone of claim 1 wherein said tangential inlet is rectangular.

8. The hydrocyclone of claim 1 wherein said outer surface is an axially extending outer surface, said outer surface comprising a first cylindrical portion, connecting to a frusto-conical portion which tapers toward said underflow end.

9. The hydrocyclone of claim 8 wherein a second cylindrical portion is disposed around a portion of said frusto-conical portion and said second cylindrical portion has a diameter that is not greater than the diameter of said first cylindrical portion.

10. The hydrocyclone of claim 9 wherein said means for retaining a second sealing member is disposed around said first cylindrical portion and said means for retaining a first sealing member is disposed around said second cylindrical portion.

11. The hydrocyclone of claim 10 wherein said means for retaining a second sealing member and said means for retaining a first sealing member are annular grooves.

12. The hydrocyclone of claim 11 wherein O-rings are disposed in said annular grooves.

13. The hydrocyclone of claim 11 wherein said second cylindrical portion has a smaller diameter than the diameter of said first cylindrical portion.

14. The hydrocyclone of claim 13 wherein O-rings are disposed in said annular grooves.

15. The hydrocyclone of claim 1 wherein said distal end is provided with at least one scallop to permit exit of the overflow.

16. The hydrocylone of claim 1 wherein said tubular vortex-finder member is snap-fitted into said body.

17. The hydrocyclone of claim 16 fitted and sealed in first and second opposing apertures in first and second wall members, respectively, of a separator assembly, said first aperture having an inside diameter of a size which prevents said body from opening up and thereby prevents said tubular vortex-finder member from being pulled out or so pushed out of said body.

18. A separator assembly comprising:

a cylindrical first wall member and a cylindrical second wall member, said second wall member being disposed concentrically within said first wall member and defining an inlet chamber between them, the second wall member having a cylindrical interior portion defining an underflow outlet chamber;

a cylindrical outer housing being disposed concentrically around said first wall member and defining an overflow outlet chamber between them;

said wall members each having at least one pair of opposing apertures communicating with said respective outlet chambers;

a hydrocyclone of claim 1 fitted and sealed in each pair of opposing apertures.

19. The separator assembly of claim 18 wherein said outer housing has an inner wall in opposing relation to an outer wall of said cylindrical first wall member, the overflow outlet being defined by said inner wall and said outer wall, the distal end of each said hydrocyclone being spaced a distance from said inner wall when said radially projecting stop member is in abutting relation to said outer wall, each said hydrocyclone being allowed to float laterally along its central axis by said distance and said inner wall cooperating with said distal end to prevent said hydrocyclone from floating out of said apertures.

20. A process of purifying corn starch comprising pumping a suspension to be classified into said inlet chamber of the separator assembly of claim 18, under pressure, such that said suspension is forced from said inlet chamber through said tangential inlet of said hydrocyclone into said frusto-conical separating chamber thereof, such that said suspension is separated into an overflow which exits through said overflow outlet and an underflow which exits through said underflow outlet opening.

21. A method of assembling the separator assembly of claim 18 wherein said tubular body of said hydrocyclone is sufficiently long to extend right through said first and second wall members, and wherein said tubular body has a smaller diameter than said apertures, such that said body can be inserted through said apertures of said wall members from the outer wall of said first wall member, until said stop member abuts said outer wall of said first wall member, such that said distal end projects from said outer wall of said first wall member and said underflow end projects from said interior face of said second wall member into said underflow outlet chamber.

22. The method of claim 21, wherein said body is free to slide axially in said apertures to a small extent.

23. The method of claim 21 wherein the aperture in said first wall member has an inside diameter of a size which prevents said tubular body from opening up and thereby prevents a vortex-finder fitted in said body from being pulled out or pushed out of said body when said body is installed in the separator assembly.

24. Method of disassembling the separator assembly of claim 18 comprising removing said cylindrical outer housing and withdrawing said hydrocyclone from said concentric apertures.

25. A process of purifying corn starch comprising the forcing of a suspension to be classified through said tangential inlet of said hydrocyclone of claim 1 and into said frusto-conical separating chamber thereof, such that said suspension is separated into an overflow which exits through said overflow outlet and an underflow which exits through said underflow outlet opening.

26. The process of claim 25, wherein a plurality of said hydrocyclones are housed in a separator assembly.

\* \* \* \* \*